United States Patent [19]

Tulip

[11] Patent Number: 4,719,639
[45] Date of Patent: Jan. 12, 1988

[54] CARBON DIOXIDE SLAB LASER

[76] Inventor: John Tulip, 9218 117 St., Edmonton, Alberta, Canada, T6G 2G7

[21] Appl. No.: 1,572

[22] Filed: Jan. 8, 1987

[51] Int. Cl.$^4$ .............................................. H01S 3/06
[52] U.S. Cl. ........................................ 372/66; 372/55; 372/95; 372/35; 372/82
[58] Field of Search ....................... 372/66, 55, 83, 95, 372/35, 34, 82, 81, 99

[56] References Cited

U.S. PATENT DOCUMENTS 3,970,961 7/1976 Breaux et al. .......................... 372/83
4,646,313 2/1987 Seeling ................................... 372/55

Primary Examiner—Leon Scott, Jr.
Attorney, Agent, or Firm—Andrus, Sceales, Starke & Sawall

[57] ABSTRACT

A carbon dioxide slab laser includes a pair of cooled metal electrodes disposed to form a gap of less than about 3 millimeters. The electrode surfaces on either side of the gap are polished and highly reflectant. A radio frequency discharge is provided between the electrodes to pass through gas disposed in the gap which is suitable for laser action. Cooling of the gases between the electrodes is achieved by conduction to the metal surfaces of the electrodes. Contrary to conventional flowing gas lasers, the two electrodes both reflect and guide the laser light and serve to cool the gas by conduction.

14 Claims, 3 Drawing Figures

CARBON DIOXIDE SLAB LASER

BACKGROUND AND SUMMARY OF THE INVENTION

The present invention relates to lasers, and more particularly to a carbon dioxide slab laser.

Practical limitations arise in the operation of solid rod lasers due to the thermal gradients required to dissipate heat from the rod. A basic thermal problem common to all laser materials is that of optical distortion and birefringence. Research in heat removal techniques has lead to a variety of designs and constructions commonly known as disc, slab, and zig-zag lasers. In these developments, the approach has been to increase the cooling surface of a given volume of laser material to allow higher power dissipation densities with a lower internal temperature, and at the same time to adjust the direction of heat flow so that refractive gradients resulting from the heat flow have a minimum effect on the laser beam.

In the disc laser, a solid rod is segmented into discs which are perpendicular or at an angle to the optical axis. The individual discs are face cooled by forcing a suitable cooling fluid through the spaces between the discs. With such a design the heat flow paths are essentially parallel to the optical axis ideally resulting in no radial distortion of the laser beam. However, no significant improvement over the performance of solid rod lasers has been demonstrated with the disc laser due to problems involving stresses and optical distortions in the discs due to edge cooling effects, optical losses due to surface scattering and attenuation in the coolant, and mechanical problems associated with holding the discs in an exactly fixed position relative to each other and to the optical axis of the laser system.

Rectangular slab lasers provide a larger cooling surface and essentially a one dimensional temperature gradient across the thickness of the slab. For example, a typical NdYAG laser rod is of a cylindrical shape and water-cooled at the rod surface. The NdYAG laser rod is pumped optically using either krypton or xenon discharge lamps, and since light from these lamps is absorbed more or less uniformly within the rod, the center or axis of the rod tends to heat up. The temperature gradient from the center to the wall of the rod causes a gradation of optical property across the diameter of the rod. This gradation in turn causes difficulty with designing a good quality laser resonator. One solution to this optical gradient problem lies in the use of the slab geometry describes in references such as Koechner, "Solid State Laser Engineering", Section 7.3, pages 390-396; Chun et al "Resonant-Mode Analysis of Single-Mode Face Pumped Lasers", Applied Optics, Volume 16, No. 4, April, 1977, pages 1067-1069; and Jones et al, IEEE J. Quantum Electronics, Volume 7, pages 534-535. The slab geometry tends to cancel the effect of the heat gradients because the laser beam zigzags in the plane of variation.

In a conventional carbon dioxide laser the discharge tube is typically 1 cm in diameter and is cooled with a water jacket. The $CO_2$ gas is cooled by conduction to cooled outer walls. In order to enhance this cooling, high powered carbon dioxide lasers use flowing gas so that the gas as it moves along the border of a discharge tube carries heat with it. Alternate geometries provide for gas flow transverse to the discharge direction in an open geometry as described in for example Locke "Multi-kilowatt Industrial $CO_2$ Lasers: A Survey", Industrial Applications of High Power Laser Technology, SPIE Vol. 86, 1976, pages 2-10.

Waveguide gas lasers are of the type wherein laser light proprogates through a hollow waveguide which also serves to confine the laser exciting discharge. Such lasers are described in Laakmann, U.S. Pat. No. 4,169,251; Lachambre et al "A Transversely RF-excited $CO_2$ Waveguide Laser", Applied Physics Letters, Vol. 32, No. 10, May 15, 1978, pages 652-653; Laakmann "Transverse RF Excitation For Waveguide Lasers", Proceedings of the International Conference on Lasers, 1978, pages 741-743; Smith "A Waveguide Gas Laser", Applied Physics Letters, Vol. 19, No. 5, Sept. 1, 1971, pages 132-134; and Bridges et al, "$CO_2$ Waveguide Lasers", Applied Physics Letters, Vol. 20, No. 10, May 15, 1972, pages 403-405. These references generally describe the radio frequency discharged pumped waveguide $CO_2$ laser, and the direct current pumped waveguide laser. In this type of device, cooling to the walls of the waveguide is relatively efficient since the waveguide dimensions are typically only a few millimeters. The laser resonator in this type of device is generally not open as in other $CO_2$ lasers, and the light is generally guided by the waveguide chamber. Typically, the resonator is made up by placing mirrors at each end of the waveguide. Advantageously, this type of device is compact because the waveguide is relatively small. However, the power from a sealed carbon dioxide waveguide laser is typically only 0.5 watts per centimeter length of discharge. Even though laser gas cooling and excitation are efficient, the gas volume is very small so that no net appreciable power benefit results.

In the present invention, a slab geometry has been combined with gas laser techniques to provide a structure which will generate high laser power per unit length of discharge. Additionally, conduction cooling of this structure aids in generating the high laser output power.

The geometry of the present gas slab laser, preferably a $CO_2$ slab laser, includes a pair of cooled metal electrodes disposed parallel and in opposition to one another so that the separation of the electrode surfaces form a gap typically limited to about 5 millimeters or less in depth. The electrode surfaces are highly polished to provide a pair of highly reflective surfaces. A radio frequency discharge is provided between the electrodes suitable for creating laser action. Cooling of the gases between the electrodes is achieved by conduction to the metal surfaces of the electrodes and by flowing the gases transversely to the length of the electrodes. Unlike conventional flowing gas $CO_2$ lasers, the electrodes of the present invention reflect and guide the laser light as it is propagated along the gap, and also serve to cool the gas by conduction.

The advantage offered by conduction cooling of the gases via the metal electrodes is complicated by the need for phase coherent single mode operation of a laser resonator. If a laser beam is to be focused to a diffraction limited spot, for surgery for example, then the beam must be phase coherent. All other beams give a larger focal spot. Typically, a resonator is formed by placing appropriate reflector mirrors at each end of the electrode geometry. For example, in a conventional $CO_2$ laser the operation in single mode is achieved using an unstable resonator or suitable designed stable resonator. In a waveguide laser, both of the transverse dimensions of the waveguide are limited to typically less than about 3 millimeters, and plain mirrors are placed at each end of the waveguide chamber to result in single mode operation. In the waveguide laser the mode of oscillation is determined not by the resonator but by the waveguide cavity.

In contrast the slab $CO_2$ geometry will guide the laser beam in one plane but is open in the other plane and will not guide and confine the beam. Unlike the waveguide laser the direction of propogation of the beam is determined by the resonator mirrors and not by the laser geometry. The thickness of a solid state slab is typically 1 cm so that the beam may zig zag along the slab at many different angles to the axis of the slab and each angle corresponds to a mode of propogation. The beam in such a solid state slab will hence be multimode and not phase coherent. In this $CO_2$ slab laser the discharge slab thickness is typically 2 mm and under these conditions a single grazing angle of zig zag propogation of the laser beam along the axis of the discharge is preferred so that a single mode of propogation will dominate in the guided plane. In the unguided plane the laser beam is confined to the discharge slab by reflection from resonator mirrors placed at each end of the electrodes.

In contrast, it has been discovered that single mode operation of the present slab gas laser will result if either of two resonator structures are used. If the electrodes are approximately 1 cm or less in width, then a resonator of the stable type will result in a single mode laser output beam. For example, a plane partially transparent mirror on one end and a concave totally reflective spherical mirror on the other end will result in a single mode laser output beam. On the other hand, if the electrodes are in excess of one centimeter in width then a resonator of the unstable type is necessary. For example, a concave totally reflective spherical mirror and a convex totally reflective spherical mirror placed 30 cm apart at opposite ends of the electrodes will result in single mode operation. Additionally, if the electrodes are held apart to provide a gap of 2 millimeters and the distance between the edge of the electrode and the convex mirror is also held at about 2 millimeters, then a beam of 2 millimeters square will emerge which some distance from the laser becomes circular, i.e. a single mode operation.

The present invention thus provides a gas slab laser which will generate more gas laser power per unit length of discharge than other conduction cooled gas laser structures. Additionally, the present invention provides a laser resonator which will produce a single mode laser beam from a gas slab discharge. For applications such as surgery where size of the laser is important this is clearly an advantage.

BRIEF DESCRIPTION OF THE DRAWINGS

The drawings illustrate the best mode presently contemplated of carrying out the invention.

In the drawings.

DESCRIPTION OF THE PREFERRED EMBODIMENT

Figure 1:
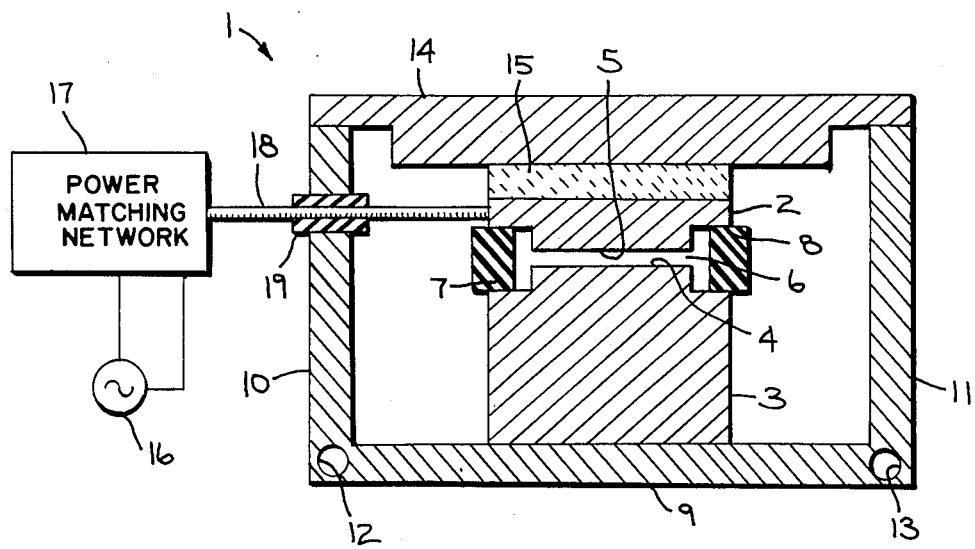
FIG. 1 is a cross sectional view in schematic form illustrating a carbon dioxide slab laser system constructed in accordance with the principles of the present invention.

Referring now to the drawings, FIG. 1 illustrates a sealed carbon dioxide slab laser, generally designated by the numeral 1, constructed in accordance with the principles of the present invention. Laser 1 includes a pair of opposing elongated spaced apart electrically conductive electrode members 2 and 3 each having a planar surface 4, 5 respectively, disposed parallel to and spaced from one another. Surfaces 4 and 5 are highly polished to provide an optically reflective construction or are coated with a highly reflective material. The separation between surfaces 4 and 5 define an elongated gap 6 wherein a laser exciting discharge is generated. Gap 6 may have dimensions ranging about 1 mm to about 5 mm in depth, about 2 mm in width, and about 5 cm in length. Although the laser discharge gap 6 is illustrated in FIG. 1 as having a rectangular cross section, other cross sectional configurations, such as square may also be employed. The distance between electrode surfaces 4 and 5 should be suitable for reflecting and guiding laser light, and typically this distance should be limited to about 3 millimeters or less. For example, gap 6 may have a depth of about 2.25 millimeters, a width of about 3 centimeters (which would correspond to the width of surfaces 4, 5), and a length of about 30 cm.

The electrode members 2 and 3 may be of any electrically conductive metal such as aluminum, or they may be of dielectric material such as alumina. In the case of dielectric electrodes then an electrically conducting surface must be placed behind the dielectric. Electrodes 2 and 3 are separated from each other by means of insulating spacers 7 and 8. Electrodes 2 and 3 may be secured to spacers 7, 8 either mechanically or by means of any suitable bonding material. The assembly including electrodes 2, 3 and spacers 7, 8 is mounted on a base 9 of a U-shaped housing which encloses the sides of the assembly by a pair of opposite upright side walls 10 and 11. Base 9 and side walls 10, 11 are preferably composed of a material having a high thermal conductivity and structural rigidity such as copper. In order to enhance heat removal a pair of passageways 12 and 13 are formed at the juncture of the base 9 and side walls 10, 11. Cooling water may be forced through passageways 12, 13 to aid in heat removal. The U-shaped housing is enclosed by a cover 14, and a ceramic insulator 15 is disposed between cover 14 and electrode 2.

The discharge gap 6 is filled with any desired laser gas. As a specific example, the laser gas may be a standard $CO_2$ laser gas mixture, namely, 65% helium, 22% nitrogen and 13% carbon dioxide by mole fraction. It should be understood, however, that other laser gases and gas mixtures also may be employed. Typical laser gas pressures may range from about 10 millibar to about 400 millibar with about 200 millibars preferred.

A radio frequency generator 16 such as a 1 kilowatt 72 megahertz vacuum tube radio frequency generator, is coupled between electrodes 2 and 3 to supply the appropriate operating frequency discharge in the laser gas sufficient to invert the population of the energy levels of the desired laser transition. The discharge created by the radio frequency generator has a frequency ranging from about 10 megahertz to about 200 megahertz, and is applied through a power matching network 17 of conventional circuitry, as is common. It is to be understood that any appropriate power matching network circuitry may be employed as desired. The radio frequency current from network 17 passes through cable 18 to electrodes 2 and 3. Cable 18 is insulated from side wall 10 by means of any appropriate insulating electrical feedthrough 19.

Figure 2:
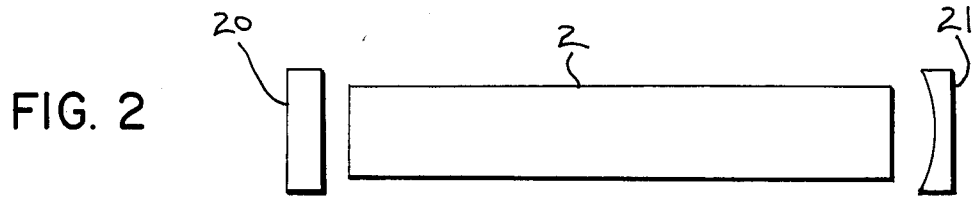
FIG. 2 is a schematic plan view of a resonator structure for the laser of FIG. 1 used to produce single mode operation.
Figure 3:
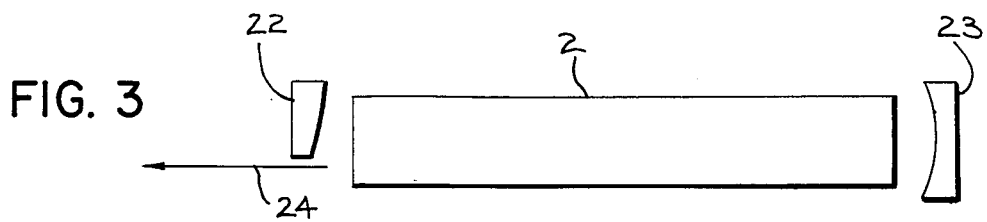
FIG. 3 is a view similar to FIG. 2 illustrating an alternate construction for producing single mode operation of the slab laser of FIG. 1.

When laser 1 is to be operated as an oscillator, and in order to obtain phase coherent single mode operation, a resonator is formed by providing either one of two resonator structures. Referring to FIG. 2, if the electrode 2 or 3 has a width of approximately 1 cm or less, a resonator of the stable type will result in a single mode output laser beam. In other words, a pair of aligned reflectors 20 and 21 are disposed at opposite ends of electrodes 2 and 3 which is at opposite ends of gap 6 along the longitudinal axis thereof. Reflector 20 is a plane partially transparent mirror while reflector 21 is a concave spherical mirror preferrably having a 15 meter radius and is a totally reflective mirror. Under such conditions, a single mode output laser beam is provided during operation. If on the other hand, electrodes 2 and 3 are in excess of about 1 cm in width, then a resonator of the unstable type is necessary. Referring to FIG. 3, there is shown electrode 2 having a width greater than 1 cm and a pair of aligned reflectors 22 and 23 disposed at opposite ends thereof, i.e. at opposite ends of gap 6. More specifically, reflector 22 may comprise a concave mirror preferably of 20 meter spherical curvature while reflector 23 may comprise a convex mirror preferably of 19 meter spherical curvature. Mirrors 22 and 23 placed about 30 cm apart will result in single mode operation. For example, if the electrodes 2 and 3 are disposed such that gap 6 is 2 millimeters, and the distance between the edge of electrodes 2 and 3 and convex mirror 22 is also about 2 millimeters, then a square laser beam represented by arrow 24 of 2 millimeters square section will emerge due to light diffraction across the edge of mirror 22. In the far field, some distance from laser 1, this square beam 24 becomes a circular gaussian beam of the first order, i.e. a single mode output beam. With a 1 kilowatt 72 megahertz radio frequency generator, and with a 30 cm length of discharge, a power output of approximately 100 watts is obtainable. In contrast, a conventional sealed discharge tube $CO_2$ laser or waveguide laser would typically generate only 15 watts of laser output power for a similar length.

Laser 1, however, may also be operated as an amplifier. In such case, mirrors 20-23 would be replaced by transparent windows which allow a laser beam to be amplified to enter and exit gap 6.

The present invention thus provides a laser structure which will generate more output power per unit length of discharge than other sealed $CO_2$ lasers or waveguide lasers. Laser 1 also provides a laser resonator which will produce a single mode laser beam from a $CO_2$ slab discharge structure.

Various modes of carrying out the invention are contemplated as being within the scope of the following claims particularly pointing out and distinctly claiming the subject matter which is regarded as the invention.

I claim:

1. A gas slab laser comprising:
   first and second elongated electrodes each including a planar light reflecting surface disposed so as to form a light guide only in a plane perpendicular to the said planar surface and to define a gas discharge gap therebetween;
   a laser gas disposed in said gap; and
   means for applying a radio frequency current between said first and second electrodes to establish a laser-exciting discharge in said laser gas.

2. The slab laser of claim 1 wherein the distance between said planar surfaces is about 5 millimeters or less.

3. The slab laser of claim 1 wherein said gap is about 3 centimeters wide, about 30 centimeters in length and about 2.00 millimeters in depth.

4. The slab laser of claim 1 wherein said laser gas is at a pressure ranging from about 10 millibars to about 400 millibars.

5. The slab laser of claim 1 wherein said laser gas consists of a mixture of $CO_2$, He and $N_2$.

6. The slab laser of claim 1 wherein said current is applied at a frequency ranging from about 10 megahertz to about 200 megahertz.

7. The slab laser of claim 1 further including means for cooling said electrodes.

8. The slab laser of claim 1 further including laser resonator positioned at opposite ends of said gap.

9. The slab laser of claim 8 wherein said laser resonator is a stable resonator.

10. The slab laser of claim 9 wherein the said stable laser resonator includes a concave totally reflective light reflector at one end of said gap and a plane partially transparent light reflector at the other end of the said gap.

11. The slab laser of claim 8 wherein said laser resonator is an unstable resonator.

12. The slab laser of claim 11 wherein said unstable laser resonator is of the confocal type and includes a concave total reflector at one end of said gap and a convex total reflector at the other end of said gap.

13. The slab laser of claim 1 where said electrodes are electrically conducting.

14. The slab laser of claim 1 wherein said electrodes are composed of dielectric material.

* * * * *

UNITED STATES PATENT AND TRADEMARK OFFICE
CERTIFICATE OF CORRECTION

PATENT NO. : B1 4,719,639
DATED : June 28, 1994
INVENTOR(S) : John Tulip

It is certified that error appears in the above-indentified patent and that said Letters Patent is hereby corrected as shown below:

On the title page:
Item : [56]   References Cited
under the heading "Other Publications":

A.E. Siegman, Chapters 22-23, "Unstable Optical Resonators, <u>Lasers</u>, published by University of Science Books, copyright 1986, pp. 858-922.

J. Salzman, T. Venkatesan, R. Lang, M. Mittelstein & A. Yariv, "Unstable resonator cavity semiconductor lasers," <u>Appl. Phys. Lett.</u>, 1 February 1985, pp. 218-220.

Signed and Sealed this

Twenty-fifth Day of April, 1995

Attest:

BRUCE LEHMAN

*Attesting Officer*      *Commissioner of Patents and Trademarks*

REEXAMINATION CERTIFICATE (2321st)
United States Patent [19]

Tulip

[11] B1 4,719,639

[45] Certificate Issued Jun. 28, 1994

[54] CARBON DIOXIDE SLAB LASER

[75] Inventor: John Tulip, Edmonton, Canada

[73] Assignee: Boreal Laser Inc., Edmonton, Canada

Reexamination Requests:
No. 90/002,824, Sep. 9, 1992
No. 90/002,991, Mar. 10, 1993

Reexamination Certificate for:
Patent No.: 4,719,639
Issued: Jan. 12, 1988
Appl. No.: 1,572
Filed: Jan. 8, 1987

[51] Int. Cl.$^5$ ............................................. H01S 3/06
[52] U.S. Cl. ............................. 372/66; 372/35; 372/82; 372/55; 372/95
[58] Field of Search ................. 372/66, 55, 34, 35, 372/95, 83, 81, 82, 99

[56] References Cited

U.S. PATENT DOCUMENTS

| | | |
|---|---|---|
| 3,748,594 | 7/1973 | Pugh . |
| 4,169,251 | 9/1979 | Laakmann ................... 331/94.5 G |
| 4,481,634 | 11/0684 | Grossman et al. . |
| 4,559,627 | 12/1785 | Chun . |
| 4,651,325 | 3/1987 | Wang et al. .................. 372/64 |

OTHER PUBLICATIONS

Yatsiv et al, "Radio Frequency Excited Stripline CO and $CO_2$ Lasers"; Conf. on Lasers & Optics; Jun. 1984, p. 28.

Myshenkov et al., "Prospects for Using High-Frequency Capacitative Discharges in Lasers", Sov. J. Quantum Electron, 11 (10), Oct. 1981, pp. 1297-1301.

Krupke et al., "Properties of an Unstable Confocal Resonator $CO_2$ Laser System", IEEE Journal of Quantum Electronics, vol. QE-5, No. 12, Dec. 1969, pp. 575-586.

Borghese et al., "Unstable-Stable Resonators with Toroidal Mirrors", Applied Optics, vol. 20, No. 20, Oct. 1981, pp. 3547-3552.

Siegman, *Lasers*, Copyright 1986 by University Science Books, pp. 902-904 and 910-912.

Landro et al., "High-Pressure cw rf-Excited $CO_2$ Waveguide Laser", Conference on Laser and Electro Optics, Jun. 1984, p. 190.

Miles et al., "Optical Gain Measurements at 10.6 um in an 80 um Hollow-Core Slab Waveguide", IEEE Journal of Quantum Electronics, vol. CE-17, No. 6, Jun. 1981, pp. 1071-1074.

Bourne et al., "A Novel Stable-Unstable Resonator for Beam Control of Rare-Gas Halide Lasers", Optics Communications, vol. 31, No. 2, Nov. 1979, pp. 193-196.

Siegman, "Unstable Optical Resonators", Applied Optics, vol. 13, No. 2, Feb. 1974, pp. 353-367.

Lovold et al; "Ten-Atmospheres High Repetition Rate RF-Excited, $CO_2$ Waveguide Laser", Appl. Phys. Lett. vol. 40, No. 1; Jan. 1, 1992; pp. 13-15.

Christensen et al.; "Transverse Electrodeless RF Discharge Excitation of High Pressure Laser Gas Mix", IEEE JQE, vol. QE-16, No. 9; Sep. 1980; pp. 949-954.
Wang et al (Paranto) "RF-Pumped Infrared Laser Using Transverse Gas Flow"; IEEE JQE vol. QE-20, No. 3; Mar. 1984; pp. 284-288.

*Primary Examiner*—Leon Scott, Jr.

[57] ABSTRACT

A carbon dioxide slab laser includes a pair of cooled metal electrodes disposed to form a gap of less than about 3 millimeters. The electrode surfaces on either side of the gap are polished and highly reflectant. A radio frequency discharge is provided between the electrodes to pass through gas disposed in the gap which is suitable for laser action. Cooling of the gases between the electrodes is achieved by conduction to the metal surfaces of the electrodes. Contrary to conventional flowing gas lasers, the two electrodes both reflect and guide the laser light and serve to cool the gas by conduction.

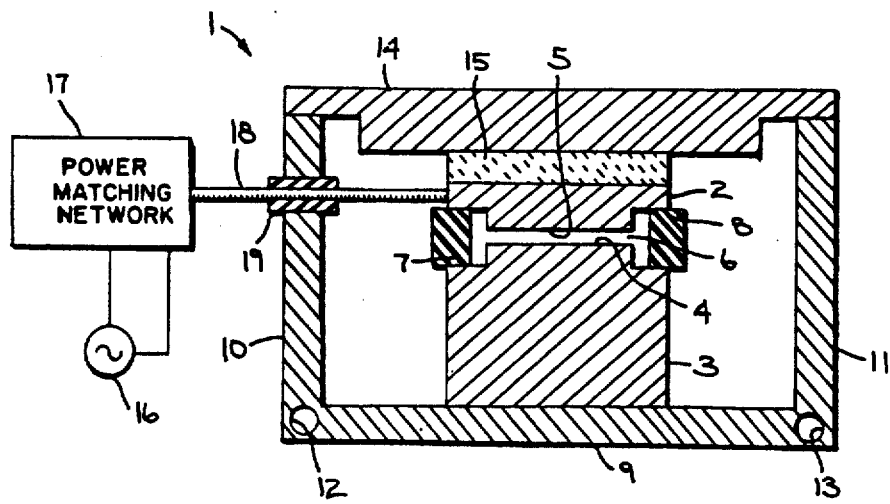

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-14 are cancelled.

New claims 15-27 are added and determined to be patentable.

*15. A gas slab laser comprising:*
*first and second elongated electrodes each including a planar light reflecting surface disposed so as to form a light guide between the said planar surfaces and to define a gas discharge gap therebetween, the electrodes having a spacing between them and including a first end and a second end;*
*a laser gas disposed in said gap;*
*means for applying a radio frequency current between said first and second electrodes to establish a laser discharge in said laser gas between the electrodes; and*
*a first mirror at the first end of the electrodes and a second mirror at the second end of the electrodes, one of the mirrors being placed to diffraction couple laser light from the discharge gap, and to thereby form an unstable laser resonator that together with the spacing of the first and second elongated electrodes controls the propagation modes of light within the laser.*

*16. The gas slab laser of claim 15 in which the width of the electrodes is greater than 1 cm.*

*17. The gas slab laser of claim 16 in which the mirrors are totally reflecting.*

*18. The gas slab laser of claim 17 in which the laser gas consists of a mixture of He, $CO_2$ and $N_2$.*

*19. The gas slab laser of claim 15 in which the width of the electrodes is at least 10 times the spacing of the electrodes.*

*20. The gas slab laser of claim 19 in which the spacing of the electrodes is 3 mm or less and the width of the electrodes is greater than 1 cm.*

*21. The gas slab laser of claim 15 in which the mirrors are totally reflecting.*

*22. The gas slab laser of claim 15 in which the electrodes provide predominant conduction cooling of the discharge.*

*23. The gas slab laser of claim 15 in which the laser gas is at a pressure ranging from about 10 mbar to about 400 mbar.*

*24. The gas slab laser of claim 15 in which the laser gas consists of a mixture of He, $CO_2$ and $N_2$.*

*25. The gas slab laser of claim 15 in which the radio frequency current is applied at a frequency ranging from about 10 MHz to about 200 MHz.*

*26. The gas slab laser of claim 15 in which the electrodes are composed of dielectric material having a conducting surface placed behind them.*

*27. The gas slab laser of claim 15 in which the unstable laser resonator is of the confocal type and includes a concave total reflector at the first end of the electrodes and a convex total reflector at the second end of the electrodes.*

* * * * *